(12) United States Patent
Date et al.

(10) Patent No.: US 6,790,881 B2
(45) Date of Patent: Sep. 14, 2004

(54) ADHESIVE COMPOSITION

(75) Inventors: Hiroaki Date, Kawasaki (JP);
Tomohisa Yagi, Kawasaki (JP);
Makoto Sasaki, Kawasaki (JP);
Hideshi Tokuhira, Kawasaki (JP);
Nobuhiro Imaizumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 64 days.

(21) Appl. No.: 10/254,538

(22) Filed: Sep. 26, 2002

(65) Prior Publication Data

US 2003/0069333 A1 Apr. 10, 2003

Related U.S. Application Data

(63) Continuation of application No. PCT/JP00/09446, filed on Dec. 28, 2000.

(30) Foreign Application Priority Data

Mar. 28, 2000 (JP) ........................................ 2000-087916

(51) Int. Cl.$^7$ ............................ C08K 7/16; C08K 5/34; C08K 5/24; C08K 3/10; C08K 3/34
(52) U.S. Cl. ........................ 523/205; 523/223; 524/106; 524/261; 524/403; 524/413; 524/442
(58) Field of Search ................................ 523/205, 223; 524/106, 261, 403, 413, 442

(56) References Cited

U.S. PATENT DOCUMENTS 6,680,007 B2 * 1/2004 Honda et al. ............... 252/511

FOREIGN PATENT DOCUMENTS

| EP | 0 459 614 A2 | 12/1991 |
|---|---|---|
| JP | 61-221279 | 10/1986 |
| JP | 3-234782 | 10/1991 |
| JP | 5-9263 | 1/1993 |
| JP | 6-25470 | 2/1994 |
| JP | 7-102225 | 4/1995 |
| JP | 11-166169 | 6/1999 |

* cited by examiner

*Primary Examiner*—Kriellion A. Sanders
(74) *Attorney, Agent, or Firm*—Armstrong, Kratz, Quintos, Hanson & Brooks, LLP

(57) ABSTRACT

A single-liquid type adhesive composition contains a main agent, an imidazole serving as a hardener, and a hardening promoter for increased hardening speed. The imidazole has its surface covered by a thermoplastic resin, and the hardening promoter is provided by a modified imidazole composition with its imino group (—NH—) having the H replaced by a specific reaction retarder group.

15 Claims, 1 Drawing Sheet

ADHESIVE COMPOSITION

REFERENCE TO RELATED APPLICATION

This application is a continuation of International Application PCT/JP00/09446 filed Dec. 28, 2000.

TECHNICAL FIELD

The present invention relates to a thermosetting adhesive composition used in bonding e.g. an electronic part such as a semiconductor chip to a substrate.

BACKGROUND ART

In recent years, with development in the semiconductor industry, a number of bonding methods other than conventional solder bonding are proposed for bonding electronic parts such as a semiconductor chip to a substrate. Among these, adhesive compositions are replacing the solder in consideration of cost, bonding temperature and environmental issues.

According to conventional adhesive compositions for bonding electronic parts, a mainstream prescription includes a main agent such as an epoxy resin and a hardener such as an acid anhydride or imidazole compound, and the main agent is hardened through heating (See the JP-A 6-200228 for example.) In such a composition, in order to shorten the hardening time, the hardener is provided in a highly active form of liquid, or a hardening promoter is added as disclosed in the JP-A 2000-129237 for example.

However, when the hardening speed is increased as conventionally by the use of the liquid hardener or the hardening promoter, the hardening speed at room temperatures is also increased. Therefore, if the adhesive composition is provided as a single-liquid, it will have a short pot life (so called usable time, or a period of time for which the composition can be used), and will have to be stored in a frozen state for example, in order to prevent the main agent and the hardener from reacting each other before use. Further, the frozen composition must be allowed to thaw at room temperature upon use. This not only decreases operability but also can cause a problem that moisture in the air is absorbed by the composition and deteriorates composition characteristics during the thawing process. In an attempt to solve this problem, a proposal was made that a micro-grain powder is fixed onto an active group on the hardener surface thereby coating the active group (Japanese Patent Laid-Open No. 9-87364). The proposed method certainly extends the pot life even when the composition is supplied as a single liquid. On the contrary however, fixing the micro-grain powder onto the active group is an extremely time consuming, low operability process, and it is extremely difficult to maintain a reliable fixation of the micro-grain powder onto the active group for a long period of time. Thus, the improvement in the pot life is not satisfactory.

On the other hand, if the composition is provided in the form of a two-liquid type adhesive, use of a hardener which is highly active with the main agent is possible even without freezing since there is no risk for the main agent and the hardener to react prematurely. On the contrary however, the main agent and the hardener must be mixed with each other upon use, at a cost of decreased operability.

As described above, it has been difficult to provide an adhesive composition which is superior in all aspects of hardening speed, operability and storage (pot life).

DISCLOSURE OF THE INVENTION

The present invention is made under the above-described circumstances, with an aim of providing a single-liquid adhesive composition which has a high hardening speed, good operability and a long pot life.

In order to solve the above-mentioned problems, the present invention makes use of the following technical means. Specifically, the present invention provides a single-liquid type adhesive composition comprising a main agent, an imidazole serving as a hardener, and a hardening promoter for increased hardening speed. The imidazole has its surface covered by a thermoplastic resin, and the hardening promoter is provided by a modified imidazole composition with its imino group (—NH—) having the H replaced by a specific reaction retarder group.

An imidazole compound which is not modified has two nitrogen atoms in its 5-member ring, as shown in the chemical formula (1) given below. These portions which contain nitrogen atoms have high reactivity. One of these nitrogen atoms (in the 1 position) is a member of the imino group, while the other nitrogen atom (in the 3 position) has a single bond with a carbon atom and a double bond with another carbon atom. In this composition, the nitrogen atom in the 1 position becomes active when the hydrogen atom as a member of the imino group is removed, whereas the nitrogen atom in the 3 position becomes active when one arm of the double bond is cut. In this case, the nitrogen in the 1 position is more likely to become active than is the nitrogen in the 3 position (because it is easier to remove the hydrogen atom than to cut the double bond.) However, once the atoms become active, the nitrogen in the 1 position has a lower reactivity than the nitrogen in the 3 position. For this reason, activating the nitrogen in the 1 position will not sufficiently promote the intended hardening, i.e. a reaction between the main agent and the hardener.

In order to solve this problem, the present invention makes use, as a hardening promoter, of a modified imidazole compound with its imino group (—NH—) having the H replaced by a specific reaction retarder group. Thus, the reaction of the imidazole compound is mainly due to the nitrogen in the 3 position which has a higher post-activation reactivity. This makes possible to sufficiently promote the hardening reaction between the main agent and the hardener.

(1)

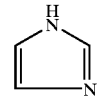

(2)

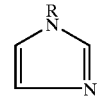

"R" represents a specific reaction retarding group.

Here, the specific reaction retarding group refers to a functional group which has a stronger connection with nitrogen than hydrogen does, and which calls for greater energy in order to cut its one hand of the double bond between nitrogen and carbon.

Further, according to the adhesive composition offered by the present invention, the hardener has its surface covered by a thermoplastic resin. Therefore, unless the thermoplastic resin becomes molten, the main agent will not react with the hardener. For this reason, even if the adhesive composition is provided as a single liquid, the composition has a remarkably improved pot life at room temperatures. Further, if provided as a single liquid adhesive, there is no need for mixing the main agent with the hardener upon use, nor is there need for freezing at the time of storage. This offers such advantages as superior operability. Still further, coating the surface of the hardener with a thermoplastic resin is easier than fixing the active group with a micro-grain particle. Thus, decrease in operability as a cost of increased pot life is smaller.

According to the present invention, the main agent can be selected from a number of different thermosetting resins such as epoxy resin, polyimide resin, polyurethane resin, urea resin, and phenol resin. Among others however, the epoxy resin is used most preferably.

The epoxy resin may be any of alicyclic, bifunctional glycidyl ether, polyfunctional glycidyl ether, glycidyl ester, and glycidyl amine.

Examples of the alicyclic epoxy resin include alicyclic diepoxy acetal, alicyclic diepoxy adipate, alicyclic diepoxy carboxylate, and vinyl cyclohexene dioxide.

Examples of the bifunctional glycidyl ether epoxy resin include bisphenol A, brominated bisphenol A, hydrogenated bisphenol A, bisphenol F, bisphenol S, bisphenol AF, biphenyl, naphthalene, and fluorene resins.

Examples of the polyfunctional glycidyl ether epoxy resin include phenol novolak, ortho-cresol novolak, DDP novolak, tris (hydroxyphenyl) methane, and tetra phenylol ethane.

Examples of the glycidyl ester epoxy resin include those produced by condensation between a carbonic acid such as phthalic acid derivative or synthetic fatty acid and epichlorohydrin (ECH).

Examples of the glycidyl amine epoxy resin include tetraglycidyldiaminodiphenylmethane (TGDDM), triglycidylisocyanurate (TGIC), hydantoin resin, 1,3-bis (N,N-diglycidyl aminomethyl) cyclohexane (TETRAD-D), aminophenol resin, aniline resin, and toluidine resin.

The epoxy resins listed above may be used individually or in combination. In particular however, abisphenol F resin is used preferably.

Examples of the imidazole compound used as the hardener according to the present invention include 2-heptadecyl imidazole, 2,4-diamino-6-(2'-methyl-imidazolyl-(1'))-ethyl-S-triazine, 2-phenylimidazole, 2-undecylimidazole, 2,4-diamino-6-(2'-undecylimidazolyl)-ethyl-S-triazine, 2-phenyl-4-methyl imidazole, 2-ethyl-4-methyl imidazole, and 2-methyl imidazole.

The thermoplastic resin for covering the imidazole hardener may be selected from a number of known thermoplastic resins, with consideration to the type (temperature range for active reaction) and relationship between the main agent and the hardener. According to the present invention, thermoplastic resin having the melting point between 50–200° C. are used preferably. Examples of such thermoplastic resin include polyethylene, polypropylene, polystyrene, polycarbonate, acrylic resin, acrylonitrile-styrene resin, acrylonitrile-butadiene-styrene resin, and polyoxymethylene.

An amount of the imidazole hardener to be added should be determined in consideration to a type of the hardener, a hardening speed to be achieved, pot life and other factors. An appropriate range may be 50–200 weight portion relative to 100 weight portion of the main agent, for example.

On the other hand, the hardening promoter used in the present invention, i.e. a modified imidazole compound, is selected appropriately in accordance with the kind of hardener to work with. Examples include 2-ethyl-4-methyl imidazole, 2-phenyl imidazole, 2-phenyl-4-methyl imidazole, 1-benzyl-2-phenyl imidazole, 1-benzyl-2-methyl imidazole, 1-cyano ethyl-2-methyl imidazole, 1-cyano ethyl-2 ethyl-4-methyl imidazole, and 1-methyl-2-ethyl imidazole, with their respective imino group having its H replaced with a specific reaction retarder group.

The specific reaction retarder group may, for example, a functional group having an epoxy ring, or hydrocarbon radical.

Examples of the functional group having an epoxy ring include a hydrocarbon radical having a pair of mutually adjacent carbon atoms being bridged with an oxygen atom, or having part of its hydrogen atoms replaced with e.g. a functional group such as a halogen group and an amino group. According to the present invention, use is made preferably of those based on the alkyl group having its mutually adjacent carbon atoms bridged with an oxygen atom.

On the other hand, the hydrocarbon radical is preferably provided by an alkyl group.

An amount of the hardening promoter to be added should be determined in consideration to a type of the hardener, a hardening speed to be achieved and other factors. An appropriate range may be 1–50 weight portion relative to 100 weight portion of the main agent, for example.

The adhesive composition according to the present invention may further contain an electrically conductive particle and may serve as an electrically conductive adhesive composition. The electrically conductive particle to be used in this case may be selected, for example, from metal particles of gold, silver, copper, nickel, iron, aluminum, and stainless steel, as well as glass particles and resin particles dressed with a metal coating. The electrically conductive particle may be further coated with an electrically insulating resin such as an epoxy resin, for uniform dissipation in the main agent.

The adhesive composition according to the present invention may further contain an inorganic filler for controlled rate of thermal expansion. The inorganic filler may be selected, for example, from alumina and silica, as well as nitrides such as aluminum nitride and boron nitride. An amount of addition of the inorganic filler ranges from 5–200 weight portion relative to 100 weight portion of the main agent, for example. Addition of the inorganic filler can cause excessive increase in viscosity of the adhesive composition. In order to avoid this, the inorganic filler should preferably have a maximum particle size not greater than 40 μm.

According to the present invention, a coupler maybe added. When a solid hardening promoter is used, the coupler improves dissipation of the hardener and decreases viscosity of the adhesive composition before the adhesive composition is hardened. Further, the coupler increases affinity between organic material and inorganic material. Addition of the coupler, therefore, to the adhesive composition increases bond between the bonding object (e.g. ceramic substrate and silicon substrate) and the main agent (i.e. thermosetting resin) after the adhesive composition is hardened.

The coupler to be used in the adhesive composition according to the present invention may be selected from silane couplers, silicone couplers, and titanate couplers.

The silane couplers are silane derivatives with their monomers not having siloxane bonds yet. Generally, in these couplers there is only one functional group per monomer that determines its chemical or physical characteristics after the polymerization. Examples of the silane couplers include vinyl trichlorosilane, vinyl tris(2-methoxyethoxy)silane, Vinyl-tris(2-methoxyethoxy)silane, gamma-methacryloxy propyl trimethoxysilane, gamma-methacryloxy propyl triethoxysilane, beta-(3,4-epoxy cyclohexyl) ethyl trimethoxysilane, gamma-glycidoxy propyl triethoxysilane, gamma-aminopropyl triethoxysilane, N-phenyl-gamma-aminopropyl trimethoxysilane, gamma-chloropropyl trimethoxysilane, and gamma-mercaptopropyl trimethoxysilane.

The silicone couplers are those whose monomers already have their main chains provided with siloxane bonds. Part of their side chains is modified to have, in general, a plurality of organic reaction groups, organic compatible groups, organic retarder groups and the like per monomer. Since a desired pattern of organic reaction groups, organic compatible groups, organic retarder groups and the like can be introduced to the side chains, the silicone couplers have greater diversity and freedom chemically and/or physically over the silane couplers. Examples of the silicone couplers include polydimethylsiloxane modified by glycyloxy propyl, polyoxylene, alkoxy, or by a combination of these. Having such modified group, the silicone coupler has a relatively high ability required of the coupler, of increasing affinity between organic material and inorganic material. Therefore, by adding a silicone coupler to the adhesive composition, it becomes possible to increase bond between the bonding object and the main agent (thermosetting resin) as after hardening of the adhesive composition.

Examples of the tinatate couplers include isopropyl triisostearoyl titanate, isopropyl tridecylbenzene sulfonyl titanate, isopropyl tris(dioctyl pyrophosphate) titanate, tetraisopropyl bis(dioctyl phosphite) titanate, tetraoctyl bis(ditridecyl phosphite) titanate, tetra(2,2-diaryloxy methyl-1-butyl)bis(di-tridecyl) phosphite titanate, bis(dioctyl pyrophosphate) oxyacetate titanate, bis(dioctyl pyrophosphate) ethylene titanate, isopropyl tri-octanoyl titanate, isopropyl di-methacryl isostearoyl titanate, isopropyl isostearoyl diacryl titanate, isopropyl tri(dioctyl phosphate) titanate, isopropyl tri-cumyl phenyl titanate, and isopropyl tri(N-aminoethyl-aminoethyl) titanate.

The couplers listed above may be used individually or in combination. Preferably, however, use should be made of gamma-mercaptopropyl trimethoxy silane, gamma-glycidoxy propyl triethoxy silane, or glycyloxypropyl-polyoxyethylene-alkoxy-modified polydimethylsiloxane. In order to take full advantage of the addition of these couplers listed above, the coupler should preferably be added at a ratio of 0.1–1.5 weight portion to 100 weight portion of the thermosetting resin, and more preferably within a range of 0.1–7 weight portion.

Additionally, the adhesive composition according to the present invention may include an antifoaming agent and/or viscosity controller. The antifoaming agent may be provided by silicone oil, silica, isoparaffin or higher aliphatic alcohol. An amount of addition should preferably be not greater than 1 weight portion relative to 100 weight portion of the thermosetting resin. On the other hand, the viscosity controller may be provided by a liquid acryl, and an amount of addition should preferably be not greater than 1 weight portion relative to 100 weight portion of the thermosetting resin.

BEST MODE FOR CARRYING OUT THE INVENTION

Figure 1:
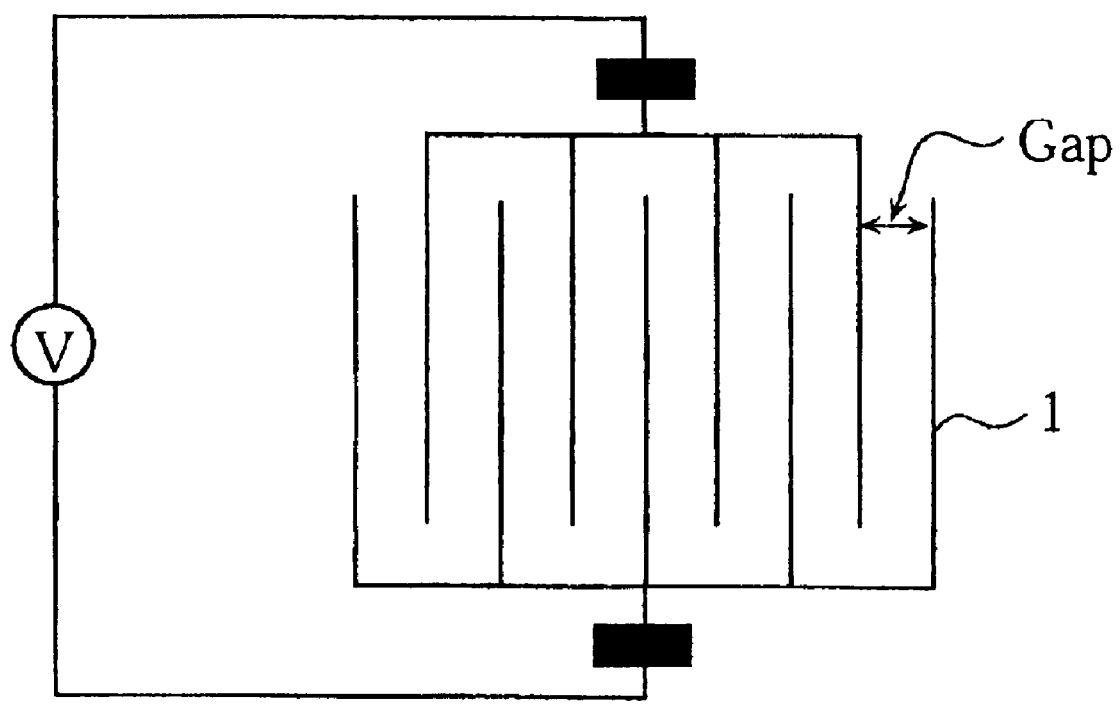
FIG. 1 is a simplified schematic of a comb-shaped pattern electrode used in an electrolytic corrosion test.

Next, embodiments of the present invention will be described along with comparative examples. It should be noted, however, that the technical concept of the present invention is not limited by these embodiments.

<Embodiment 1>

(Preparation of the Adhesive Composition)

In the present embodiment, the adhesive composition was provided by a uniform mixture of 100 weight portion of a main agent, 50 weight portion of a hardener, 20 weight portion of a hardening promoter, 200 weight portion of an electrically conductive particle, 100 weight portion of an inorganic filler and 1.0 weight portion of a coupler. The main agent was provided by a bisphenol F epoxy resin (Brand name: EXA 830 LVP, manufactured by Dainippon Ink And Chemicals, Incorporated). The hardener was provided by an imidazole compound which, with its surface covered by a thermoplastic resin, is dissipated in a bisphenol A epoxy resin (Brand name: HX3921, manufactured by Asahi-Ciba Limited). The hardening promoter was provided by a modified imidazole compound with its imino group (—NH—) having its H replaced by a functional group including an epoxy ring (Brand name: PN23J manufactured by Ajinomoto Co., Inc.) The electrically conductive particle was provided by an Ag particle having a particle size of 5–10 $\mu$m (Brand name: X-617, manufactured by Namics Corporation). The inorganic filler was provided by a fine alumina powder having a particle size not greater than 1 $\mu$m (Brand name: AO-902, manufactured by Admatechs Co., Ltd.), and the silane coupler was provided by KBM803 (Brand name, a product manufactured by Shin-Etsu Chemical Co., Ltd.) The adhesive composition was tested for bonding stability, pot life and insulation reliability.

(Bonding Stability)

The bonding stability was evaluated by measuring changes in electrical resistance as well as checking for an open circuit before and after a temperature cycle test. Specifically, first, a sample for the temperature cycle test was made, by bonding a silicon chip to a glass epoxy substrate with the adhesive composition according to the present invention. The silicon chip had 356 terminal electrodes (at a pitch of 100 $\mu$m) and the glass epoxy substrate had 356 corresponding connecting pads. The bonding was made by pressing the pieces under a temperature of 190° C. for 5 seconds. A total of 50 such samples were made. Each sample was first measured for electrical resistance, then subjected to the temperature cycle test conducted under a temperature range from –65° C. to 125° C., and then measured again for electrical conductivity. The temperature cycle test used the following temperature cycle of first cooling the sample at a temperature of –65° C. for 15 minutes, then raising the temperature to a room temperature, allowing the sample to stay in this environment for 10 minutes, and then raising the temperature to 125° C., allowing the sample to stay in this environment for 15 minutes. This cycle was repeated 500 times. According to the present embodiment, increase in the resistance after the cycle test was not greater than 10% for any of the 17800 connections (356 times 50) in the 50 samples. No open circuit was found, either. Thus, it was confirmed that the silicon chip and the glass epoxy substrate bonded to each other with the adhesive composition according to the present embodiment maintains stable bond under temperature changes.

(Pot Life)

The adhesive composition according to the present embodiment was left at a room temperature (25° C.) for 15 days, and viscosity change in the adhesive composition was measured. Further, an infrared (IR) spectrum absorption test was conducted in order to measure change in the epoxy group peak area/P-position phenylene peak area. Change in this ratio indicates that there has been a polymerizing and hardening reaction between the epoxy resin and the hardener. Results of these measurements are shown in Table 1. Similarly, the adhesive composition was kept in a freezer at −20° C. for 12 months, and the same measurements were made on the viscosity change in the adhesive composition and on the change in the epoxy group peak area/P-position phenylene peak area. Results of these measurements are also shown in Table 1.

TABLE 1

|  | Room Temperature | | Frozen | |
| --- | --- | --- | --- | --- |
|  | Upon manufacture | After 15 days | Upon manufacture | After a year |
| Adhesive composition viscosity (cps) | 12000 | 126000 | 12000 | 12900 |
| Epoxy group/ P-position phenylene | 3.254 | 3.475 | 3.254 | 3.332 |

As shown in Table 1, no significant change was found after the storage at a room temperature for 15 days, nor after the storage in the freezer temperature for 12 months, neither in the viscosity nor in the epoxy group peak area/P-position phenylene peak area. Thus, it was confirmed that according to the adhesive composition offered by the present embodiment, there is very little reaction between the main agent and the hardener not only under frozen storage but also under a room temperature, with its pot life being at least 12 months when stored at a frozen state or at least 15 days when stored at a room temperature.

(Insulation Reliability)

An electrolytic corrosion test was conducted to evaluate insulation reliability. Specifically, the adhesive composition was applied to a comb-shaped pattern electrode 1 shown in FIG. 1, and then hardened by heating at 190° C. for 5 second. Next, the electrolytic corrosion test was conducted at a temperature of 85° C., a relative humidity of 85%, using 5 VDC (direct current) for 500 hours. Insulation resistance measurements were compared before and after the test. The same test was conducted for different gap specifications of 10 μm, 20 μm and 40 μm. Results are shown in Table 2.

TABLE 2

|  | Gap | | |
| --- | --- | --- | --- |
|  | 10 μm | 20 μm | 40 μm |
| Before test (Ω) | $8.0 \times 10^{10}$ | $2.1 \times 10^{11}$ | $3.0 \times 10^{11}$ |
| After 500 hours (Ω) | $3.5 \times 10^{9}$ | $6.7 \times 10^{9}$ | $8.5 \times 10^{9}$ |

As shown in Table 2, whether the gap was small or large, change in the insulation resistance was not very large in the electrode to which the adhesive composition according to the present embodiment was applied. Thus, good durability to electrolytic corrosion, i.e. high insulation reliability was confirmed.

<Comparative Example 1>

In this comparative example, an adhesive composition was prepared according to the same prescription as for Embodiment 1, differing only in that the hardener was provided by an imidazole composition (Brand name: 2MA-OK, manufactured by Shikoku Chemicals Corporation), having its surface not covered by a thermoplastic resin. This adhesive composition was tested for bonding stability, pot life and insulation reliability. The test showed results similar to those in Embodiment 1 in terms of the bonding stability measurements in the temperature test. However, when left at a room temperature, the viscosity was more than doubled in 3 hours. This indicates that if this composition is to be provided as a single-liquid, by adding an imidazole hardener and further adding a modified imidazole compound serving as a hardening promoter, it will be necessary to cover the hardener with a thermoplastic resin in order to increase the pot life.

<Embodiment 2>

The same prescription as for Embodiment 1 was used for this embodiment, differing only in that the amount of hardening promoter was varied: 0.9 weight portion, 1 weight portion, 50 weight portion and 60 weight portion. For each of the prescriptions, the same tests as for Embodiment 1 were conducted to see bonding stability, pot life and insulation reliability. As a result, the adhesive composition containing the hardening promoter at 1 weight portion and the one containing at 50 weight portion showed results as satisfactory as Embodiment 1 in all of the bonding stability, pot life and insulation reliability. On the other hand, the adhesive composition containing the hardening promoter at 0.9 weight portion showed failure in bout 100th cycle in the temperature cycle test. In the adhesive composition containing the hardening promoter at 60 weight portion, adhesive composition viscosity became too high to flow smoothly, making it impossible to bond the silicon chip properly to the glass epoxy substrate. Thus, the amount of the hardening promoter to 100 weight portion of the main agent should preferably be in the range of 1–50 weight portion.

<Embodiment 3>

In the present embodiment, the same prescription as for Embodiment 1 was used, except for the amount of the electrically conductive particle, the inorganic filler and the coupler. Specifically, the following four variations were prepared: In variation (1), the electrically conductive particle was provided by 200 weight portion of an Ag particle (Brand name: X617, manufactured by Namics Corporation), the inorganic filler was provided by 50 weight portion of an alumina powder (Brand name: AO-902, manufactured by Admatechs Co., Ltd.) and 50 weight portion of a silica powder (Brand name: SE-05, manufactured by Admatechs Co., Ltd.), and the coupler was provided by 1.0 weight portion of a silane coupler (Brand name: KBM803, manufactured by Shin-Etsu Chemical Co., Ltd.); In variation (2), the electrically conductive particle was provided by 200 weight portion of an Ag particle (Brand name: X617, manufactured by Namics Corporation), and the coupler was provided by 1.0 weight portion of a silane coupler (Brand name: KBM803, manufactured by Shin-Etsu Chemical Co., Ltd.); In variation (3), the inorganic filler was provided by 100 weight portion of an alumina powder (Brandname: AO-902, manufactured by Admatechs Co., Ltd.), and the coupler was provided by 1.0 weight portion of a silane coupler (Brand name: KBM803, manufactured by Shin-Etsu Chemical Co., Ltd.); and in variation (4) The inorganic filler was provided by 100 weight portion of silica powder (Brand name: SO-E5, manufactured by Admatechs Co., Ltd.), and the coupler was provided by 1.0 weight portion of a silane coupler (Brand name: KBM803, manufactured by Shin-Etsu Chemical Co., Ltd.). For each of the prescriptions, the same tests as made for Embodiment 1 were conducted to see bonding stability, pot life and insulation reliability. As a result, each of the adhesive compositions showed good results as satisfactory as Embodiment 1 in all of the bonding stability, pot life and insulation reliability.

<Embodiment 4>

In this embodiment, the adhesive composition was prepared according to the same prescription as for Embodiment 1, differing only in that the amount of alumina serving as the inorganic filler was varied as follows: 10 weight portion, 20 weight portion, 200 weight portion and 210 weight portion. For each of these, the same tests as made for Embodiment 1 were conducted to see bonding stability, pot life and insulation reliability. As a result, the adhesive composition containing the alumina at 20 weight portion and the one containing at 200 weight portion showed results as satisfactory as Embodiment 1 in all of the bonding stability, pot life and insulation reliability. On the other hand, the adhesive composition containing the alumina at 10 weight portion showed failure in about 70th cycle in the temperature cycle test. In the adhesive composition containing the alumina at 210 weight portion, it was not possible to dissipate the alumina in the adhesive composition. Thus, the amount of alumina as the inorganic filler to be added to the adhesive composition should preferably be in the range of 20–200 weight portion to 100 weight portion of the main agent.

<Embodiment 5>

(Preparation of the Adhesive Composition)

In the present embodiment, the adhesive composition was provided by a uniform mixture of 100 weight portion of a main agent, 50 weight portion of a hardener, 20 weight portion of a hardening promoter, 150 weight portion of an electrically conductive particle, 100 weight portion of an inorganic filler and 2.0 weight portion of a coupler. The main agent was provided by a bisphenol F epoxy resin (Brand name: EXA 830 LVP, manufactured by Dainippon Ink And Chemicals, Incorporated). The hardener was provided by an imidazole compound which, with its surface covered by a thermoplastic resin, is dissipated in a bisphenol A epoxy resin (Brand name: HX3921, manufactured by Asahi-Ciba Limited). The hardening promoter was provided by a modified imidazole compound with its imino group (—NH—) having its H replaced by a functional group including an epoxy ring (Brand name: PN23J manufactured by Ajinomoto Co., Inc.) The electrically conductive particle was provided by a micro-capsule Ag filler made from an Ag particle having a particle size of 5–10 μm (Brand name: X61-7, manufactured by Namics Corporation) by covering the particle surface with an insulating resin to a thickness of about 0.1 μm. The inorganic filler was provided by a fine alumina powder having a particle size not greater than lpm (Brand name: AO-902, manufactured by Admatechs Co., Ltd.), and the silicone coupler was provided by MAC-2101 (Brand name, a product manufactured by Nippon Unicar Company, Ltd.). The adhesive composition was tested for bonding stability, pot life and insulation reliability.

(Bonding Stability)

The bonding stability was evaluated by measuring changes in electrical resistance as well as checking for an open circuit before and after a temperature cycle test. Specifically, first, a sample for the temperature cycle test was made, by bonding a silicon chip to a glass epoxy substrate with the adhesive composition according to the present invention. The silicon chip had 356 terminal electrodes (at a pitch of 100 μm) and the glass epoxy substrate had 356 corresponding connecting pads. The bonding was made by pressing the pieces under a temperature of 190° C. for 3 seconds. A total of 50 such samples were made. Each sample was first measured for electrical resistance, then subjected to the temperature cycle test under a temperature range from −65° C. to 125° C., and then measured again for electrical conductivity. The temperature cycle test used the following temperature cycle of first cooling the sample at a temperature of −65° C. for 15 minutes, then raising the temperature to a room temperature, allowing the sample to stay in this environment for 10 minutes, and then raising the temperature to 125° C., allowing the sample to stay in this environment for 15 minutes. This cycle was repeated 1000 times. According to the present embodiment, increase in the resistance after the cycle test was not greater than 3% for any of the 17800 connections (356 times 50) in the 50 samples. No open circuit was found, either. Thus, it was confirmed that the silicon chip and the glass epoxy substrate bonded to each other with the adhesive composition according to the present embodiment maintains stable bond under temperature change. Further, it will be understood that the bonding stability was improved over the case (i.e. Embodiment 1) in which the coupler was provided by a silane composition.

(Pot Life)

Viscosity change was measured under the same conditions as for Embodiment 1, i.e. the adhesive composition according to the present embodiment was left at a room temperature (25° C.) for 15 days, or left at a temperature of −20° C. for 12 months before the measurement. At the same time, the infrared (IR) spectrum absorption test was conducted in order to measure change in the epoxy group peak area/P-position phenylene peak area. Results of these measurements are shown in Table 3.

TABLE 3

|  | Room Temperature | | Frozen | |
| --- | --- | --- | --- | --- |
|  | Upon manufacture | After 15 days | Upon manufacture | After a year |
| Adhesive composition viscosity (cps) | 35600 | 36600 | 35600 | 34800 |
| Epoxy group/ P-position phenylene | 2.363 | 2.389 | 2.363 | 2.391 |

As shown in Table 3, no significant change was found after the storage at a room temperature for 15 days nor after the storage in the freezer for 12 months, neither in the viscosity nor in the epoxy group peak area/P-position phenylene peak area. Thus, it was confirmed that according to the adhesive composition offered by the present embodiment, there is very little reaction between the main agent and the hardener not only under frozen storage but also under a room temperature, with its pot life being at least 12 months when stored at a frozen state or at least 15 days when stored at a room temperature.

(Insulation Reliability)

An electrolytic corrosion test similar to the one for Embodiment 1 was conducted to evaluate insulation reliability. Specifically, the adhesive composition according to the present embodiment was applied to a comb-shaped pattern electrode 1 shown in FIG. 1, and then hardened by heating at 190° C. for 3 second. Next, the electrolytic corrosion test was conducted at a temperature of 85° C., a relative humidity of 85%, using 5 VDC (direct current) for 500 hours. Insulation resistance measurements were compared before and after the test. The same test was conducted for different gap specifications of 10 μm, 20 μm and 40 μm. Results are shown in Table 4.

TABLE 4

|  | Gap | | |
| --- | --- | --- | --- |
|  | 10 μm | 20 μm | 40 μm |
| Before test (Ω) | $8.0 \times 10^{10}$ | $2.1 \times 10^{11}$ | $3.0 \times 10^{11}$ |
| After 500 hours (Ω) | $3.5 \times 10^{9}$ | $6.7 \times 10^{9}$ | $8.5 \times 10^{9}$ |

As shown in Table 4, whether the gap was small or large, change in the insulation resistance was not very large in the electrode to which the adhesive composition according to the present embodiment was applied. Thus, good durability to electrolytic corrosion, i.e. high insulation reliability was confirmed.

<Comparative Example 2>

In this comparative example, an adhesive composition was prepared according to the same prescription as for Embodiment 5, differing only in that the hardener was provided by an imidazole composition (Brand name: 2MA-OK, manufactured by Shikoku Chemicals Corporation), having its surface not covered by a thermoplastic resin. This adhesive composition was tested for bonding stability, pot life and insulation reliability. The test showed results similar to those in Embodiment 5 in terms of the bonding stability measurements in the temperature test. However, when left at a room temperature, the viscosity was more than doubled in 3 hours. From this result, it will be understood that if this composition is to be used as a single-liquid, by adding an imidazole hardener and further adding a modified imidazole composition as a hardening promoter, it will still be necessary to cover the hardener with a thermoplastic resin in order to increase the pot life, even if the coupler is provided by a silicone agent.

<Embodiment 6>

The same prescription as for Embodiment 5 was used for this embodiment, differing only in that the amount of hardening promoter was varied: 0.9 weight portion, 1 weight portion, 50 weight portion or 60 weight portion. For each of the prescriptions, the same tests as made for Embodiment 5 were conducted to see bonding stability, pot life and insulation reliability. As a result, the adhesive composition containing the hardening promoter at 1 weight portion and the one containing at 50 weight portion showed results as satisfactory as Embodiment 5 in all of the bonding stability, pot life and insulation reliability. On the other hand, the adhesive composition containing the hardening promoter at 0.9 weight portion showed failure in about 200th cycle in the temperature cycle test. In the adhesive composition containing the hardening promoter at 60 weight portion, adhesive composition viscosity became too high to flow smoothly, making it impossible to bond the silicon chip properly to the glass epoxy substrate. Thus, the amount of the hardening promoter to be added should preferably be in the range of 1–50 weight portion to 100 weight portion of the main agent.

<Embodiment 7>

In the present embodiment, the same prescription as for Embodiment 5 was used, except for the inorganic filler. Specifically, the following two variations were used: In variation (1), the inorganic filler was provided by 50 weight portion of an alumina powder (Brand name: AO-902, manufactured by Admatechs Co., Ltd.) and 50 weight portion of silica powder (Brand name: SE-05, manufactured by Admatechs Co., Ltd.); In variation (2), the inorganic filler was provided by 100 weight portion of silica powder (Brand name: SO-E5, manufactured by Admatechs Co., Ltd.). For each of the prescriptions, the same tests as made for Embodiment 5 were conducted to see bonding stability, pot life and insulation reliability. As a result, each of the adhesive compositions showed good results as satisfactory as Embodiment 5 in all of the bonding stability, pot life and insulation reliability.

<Embodiment 8>

In this embodiment, the adhesive composition was prepared according to the same prescription as for Embodiment 5, differing only in that the amount of alumina serving as the inorganic filler was varied as follows: 4 weight portion, 5 weight portion, 200 weight portion and 210 weight portion. For each of these prescriptions, the same tests as made for Embodiment 5 were conducted to see bonding stability, pot life and insulation reliability. As a result, the adhesive composition containing the alumina at 5 weight portion and the one containing at 200 weight portion showed results as satisfactory as Embodiment 5 in all of the bonding stability, pot life and insulation reliability. On the other hand, the adhesive composition containing the alumina at 4 weight portion showed failure in about 200th cycle in the temperature cycle test. In the adhesive composition containing the alumina at 210 weight portion, it was not possible to dissipate the alumina in the adhesive composition. Thus, the amount of alumina as the inorganic filler to be added to the adhesive composition should preferably be in the range of 5–200 weight portion to 100 weight portion of the main agent.

<Embodiment 9>

In this embodiment, the adhesive composition was prepared according to the same prescription as for Embodiment 5, differing only in that the amount of silicone coupler (Brand name: MAC-2101, manufactured by Nippon Unicar Company, Ltd.) serving as the coupler was varied as follows: 0.09 weight portion, 0.1 weight portion, 15.0 weight portion and 16.0 weight portion. For each of these prescriptions, the same tests as made for Embodiment 5 were conducted to see bonding stability, pot life and insulation reliability. As a result, the adhesive composition containing the silicone coupler at 0.1 weight portion, the one containing at 5.0 weight portion, and the one containing at 15.0 weight portion showed results as satisfactory as Embodiment 5 in all of the bonding stability, pot life and insulation reliability. On the other hand, the adhesive composition containing the silicone coupler at 0.09 weight portion and the one containing at 16.0 weight portion showed failure in about 200th cycle in the temperature cycle test. Thus, the amount the silicone coupler to be added to the adhesive composition should preferably be in the range of 0.1–15.0 weight portion to 100 weight portion of the main agent.

<Evaluation>

As described above, the adhesive composition offered by the present invention has a high hardening speed is easy to handle (good operability), and has a long pot life. Further, bonding strength is increased when the coupler is provided by a silicone coupler.

What is claimed is:

1. A single-liquid type adhesive composition comprising a main agent, an imidazole serving as a hardener, and a hardening promoter for increased hardening speed, wherein the imidazole has its surface covered by a thermoplastic resin, and wherein the hardening promoter is provided by a modified imidazole compound having the following basic structure:

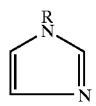

where R represents a specific reaction retarder group provided by a functional group having an epoxy ring for causing the nitrogen in the 3-position of the above basic structure to promote hardening reaction between the main agent and the hardener.

2. The adhesive composition according to claim 1, wherein an amount of the hardening promoter is 1–50 weight portion relative to 100 weight portion of the main agent.

3. The adhesive composition according to claim 1, further comprising electrically conductive particles.

4. The adhesive composition according to claim 3, wherein the electrically conductive particles are provided by Ag particles having a particle size of 5–10 µm.

5. The adhesive composition according to claim 3, wherein each of the electrically conductive particles is covered by an electrically insulating resin.

6. The adhesive composition according to claim 1, further comprising an inorganic filler.

7. The adhesive composition according to claim 6, wherein the inorganic filler has a particle size not greater than 40 µm.

8. The adhesive composition according to claim 1, further comprising a coupler.

9. The adhesive composition according to claim 8, wherein the coupler is selected from a group consisting of silane couplers, silicone couplers, and titanate couplers.

10. The adhesive composition according to claim 8, wherein an amount of the coupler is 0.1–15 weight portion relative to 100 weight portion of the main agent.

11. The adhesive composition according to claim 6, further comprising a silane coupler, wherein an amount of the inorganic filler is 20–200 weight portion relative to 100 weight portion of the main agent.

12. The adhesive composition according to claim 6, further comprising a silicon coupler, wherein an amount of the inorganic filler is 5–200 weight portion relative to 100 weight portion of the main agent.

13. The adhesive composition according to claim 1, wherein the main agent contains a bisphenol F epoxy resin.

14. A single-liquid type adhesive composition comprising a main agent, an imidazole serving as a hardener, a hardening promoter for increased hardening speed, and electrically conductive particles,
wherein the imidazole has its surface covered by a thermoplastic resin,
wherein the hardening promoter is provided by a modified imidazole compound with its amino group (—NH—) having the H replaced by a specific reaction retarder group, and
wherein the electrically conductive particles are provided by Ag particles having a particle size of 5–10 µm.

15. A single-liquid type adhesive composition comprising a main agent, an imidazole serving as a hardener, a hardening promoter for increased hardening speed, and electrically conductive particles,
wherein the imidazole has its surface covered by a thermoplastic resin,
wherein the hardening promoter is provided by a modified imidazole compound with its amino group (—NH—) having the H replaced by a specific reaction retarder group, and
wherein each of the electrically conductive particles is covered by an electrically insulating resin.

* * * * *